United States Patent
Itoh et al.

(10) Patent No.: US 6,611,304 B2
(45) Date of Patent: Aug. 26, 2003

(54) PLANAR LIGHT SOURCE DEVICE AND LIQUID CRYSTAL DISPLAY USING THE SAME

(75) Inventors: Atsushi Itoh, Kumamoto (JP); Toshiyuki Yoneda, Tokyo (JP); Yasuhito Myoi, Tokyo (JP)

(73) Assignees: Kabushiki Kaisha Advanced Display, Kumamoto (JP); Mitsubishi Denki Kabushiki Kaisha, Tokyo (JP)

( * ) Notice: Subject to any disclaimer, the term of this patent is extended or adjusted under 35 U.S.C. 154(b) by 166 days.

(21) Appl. No.: 09/819,010

(22) Filed: Mar. 28, 2001

(65) Prior Publication Data

US 2001/0053073 A1 Dec. 20, 2001

(30) Foreign Application Priority Data

Apr. 10, 2000 (JP) ........................................ 2000-108266

(51) Int. Cl.$^7$ ............................................. G02F 1/1335
(52) U.S. Cl. ........................................ 349/65; 362/31
(58) Field of Search ............................. 349/65; 362/26, 362/31

(56) References Cited

U.S. PATENT DOCUMENTS 5,280,372 A * 1/1994 Horiuchi ...................... 349/65
5,422,751 A * 6/1995 Lewis et al. .................. 349/59
5,537,296 A * 7/1996 Kimura et al. ................ 362/31
6,016,175 A * 1/2000 Kim ............................. 349/58
6,123,430 A   9/2000 Ono et al.
6,435,685 B2 * 8/2002 Matsushita .................... 362/31

FOREIGN PATENT DOCUMENTS

| JP | 6-265880  | 9/1994 |
| JP | 7-28060   | 1/1995 |
| JP | 8-240720  | 9/1996 |
| JP | 10-112214 | 4/1998 |

* cited by examiner

*Primary Examiner*—Kenneth Parker
(74) *Attorney, Agent, or Firm*—McDermott, Will & Emery

(57) ABSTRACT

To provide a planar light source device capable of preventing abnormal light emittance at a vicinity of a lamp without causing deterioration in brightness and disadvantage in view of structure and a liquid crystal display having high display grade, by projecting a reflection sheet 4 from a light guiding plate 3 to inside of a lamp reflector 2 and providing notch portions 5 at both end portions of the reflection sheet 4 projected to inside of the lamp reflector 2, interference between the projected reflection sheet 4 and electrode portions or lamp holders 1a at both ends of the lamp 1 is prevented from causing.

4 Claims, 4 Drawing Sheets

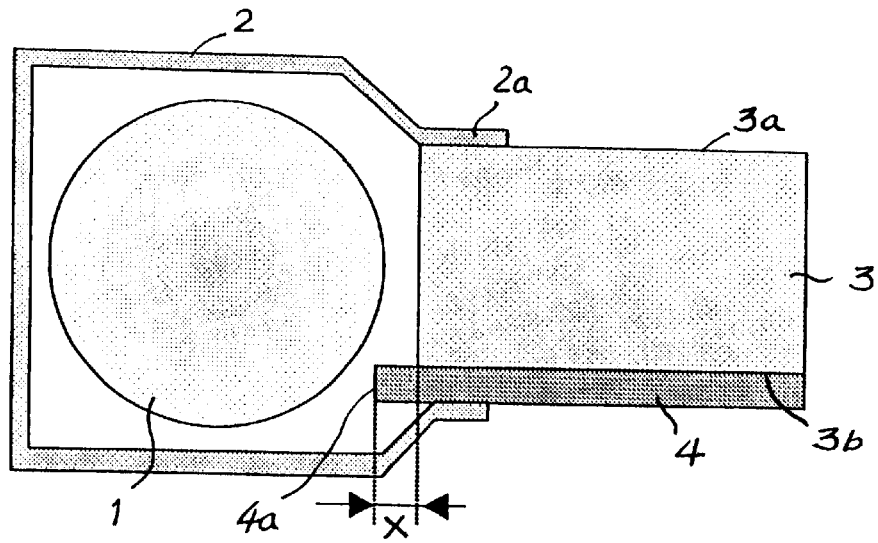
Fig. 2
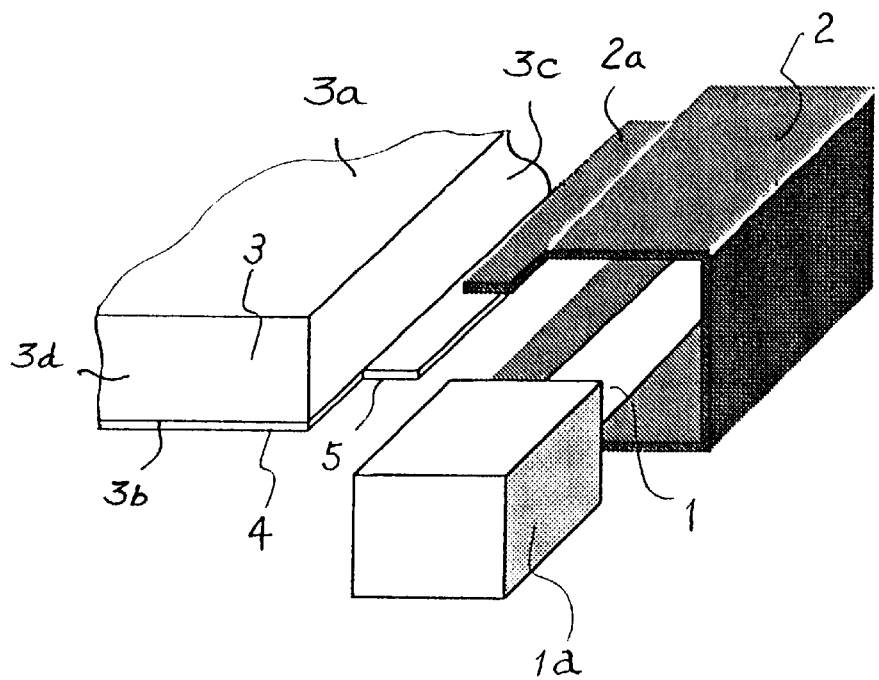

PRIOR ART

PLANAR LIGHT SOURCE DEVICE AND LIQUID CRYSTAL DISPLAY USING THE SAME

BACKGROUND OF THE INVENTION

1. Field of the Invention

The present invention relates to a planar light source device and a liquid crystal display mounted therewith as a backlight.

2. Description of the Related Art

FIG. 6 is a disassembled perspective view showing an example of a side light type of a planar light source apparatus used as a backlight of a conventional liquid crystal display apparatus and FIG. 7 is a sectional view of a vicinity of a light source of the planar light source apparatus of FIG. 6. In the drawings, numeral 1 designates a lamp comprising a cold cathode ray tube, numeral 2 designates a lamp reflector provided at a surrounding of the lamp 1 for reflecting light emitted from the lamp 1 and radiating the light in one direction and numeral 3 designates a light guiding plate comprising, for example, acrylic species resin having high transmittance of light, which is mounted with the lamp reflector 2 having the lamp 1 at one side face of a long side thereof. Numeral 4 designates a reflection sheet mounted to a side of a rear face of the light guiding plate 3 (side of light reflecting face). The planar light source apparatus constituted by the above-described members, is arranged by making a side of a light emitting face thereof opposed to a rear face side of a liquid crystal display element.

According to the above-described planar light source apparatus, light emitted from the lamp 1, reflected by the lamp reflector 2 and incident on the light guiding plate 3, is propagated in the light guiding plate 3 while repeating total reflection by a difference between refractive indices of the acrylic species resin constituting the light guiding plate 3 and air, scattered by impinging a print pattern for scattering light formed on the side of the light reflecting face of the light guiding plate 3 and emitted to the side of the light emitting face. At this occasion, the light scattered by the print pattern is scattered also to the side of the light reflecting face and accordingly, with an object of preventing the light from leaking out of the light guiding plate 3, the reflection sheet 4 is mounted to the side of the light reflecting face of the light guiding plate 3. Normally, as shown by FIG. 7, the reflection sheet 4 is inserted to inside of the lamp reflector 2 along with the light guiding plate 3.

However, although light incident on the light guiding plate 3 is ideally propagated while repeating total reflection, actually, by a surface roughness of a side face of a light incident portion of the light guiding plate 3 or light invading from a clearance between the light guiding plate 3 and the lamp reflector 2, there causes abnormal light emittance (bright line) at a vicinity of the lamp 1.

With an object of preventing the abnormal light emittance, as shown by FIG. 8, there has been proposed a method of forming a dot pattern 6 absorbing the abnormal light emittance by screen printing at a vicinity of the lamp 1 of the reflection sheet 4. Further, the dot pattern 6 is formed by using a black or gray coating to absorb the light and is printed by a width of several mm through several cm from an end portion of the reflection sheet 4 on the side of the lamp 1. Further, the dot pattern 6 is generally provided with a gradation in which the more remote from the lamp 1, the smaller the shape of the dot pattern 6 becomes.

Further, according to Japanese Patent Laid-Open No.112214/1998, with an object of reducing abnormal light emittance at a vicinity of the lamp 1, there is disclosed a method of projecting the reflection sheet 4 more than the light guiding plate 3 at inside of the lamp reflector 2.

The conventional planar light source apparatus of the side light type is constituted as described above and there has been proposed the method of projecting the reflection sheet 4 more than the light guiding plate 3 at inside of the lamp reflector 2 as a method for preventing abnormal light emittance at a vicinity of the lamp 1. Although conventionally, an electrode portion of the lamp 1 is arranged on an outer side of the light guiding plate 3 since the electrode portion does not contribute to light emittance, in accordance with a request of narrow frame formation of a liquid crystal display apparatus in recent years, electrode portions of the lamp 1 are arranged at both ends of the light guiding plate 3 and there poses a problem that the electrode portion or a lamp holder for protecting the electrode portion interferes with the reflection sheet 4 projected to inside of the lamp reflector 2.

Further, when the dot pattern 6 for absorbing light is printed at the portion of the reflection sheet 4 projected to inside of the lamp reflector 2, there poses a problem that an efficiency of utilizing light is deteriorated and the brightness is deteriorated since the dot pattern 6 inherently absorbs light incident on the light guiding plate 3.

SUMMARY OF THE INVENTION

The invention has been carried out in order to resolve the above-described problem and it is an object thereof to provide a planar light source device capable of preventing abnormal light emittance at a vicinity of a lamp without causing a deterioration in brightness and disadvantage in view of structure. Further, it is an object of the invention to provide a liquid crystal display having high display grade by using the planar light source device.

According to an aspect of invention, there is provided a planar light source device comprising a light guiding plate constituted in a shape of a plate, having a light irradiating face for irradiating light at one main face thereof and having at least one side edge in a linear shape at a peripheral edge thereof, a linear light source arranged along the side edge of the light guiding plate, a lamp reflector arranged along the side edge of the light guiding plate to cover the linear light source for reflecting light emitted from the linear light source to inside of the light guiding plate, lamp holders each arranged at inside of an end portion of the lamp reflector for holding the linear light source, and a reflection sheet provided at other main face of the light guiding plate opposed to the light irradiating face, wherein the reflection sheet includes a projected portion projected from the side edge of the light guiding plate to inside of the lamp reflector and end portions of the projected portion are provided with notch portions and accordingly, the reflection sheet is not be deformed by being brought into contact with the lamp holders.

Further, an amount of the reflection sheet projected from the light guiding plate is shorter than 2 mm.

Further, a portion of the reflection sheet proximate to the linear light source is subjected to color printing for absorbing light without a portion thereof projected from the light guiding plate.

According to another aspect of the invention, there is provided a liquid crystal display including a liquid crystal display element in a shape of a plate for sandwiching a liquid crystal material between two sheets of transparent substrates opposed to each other and a planar light source device arranged with the liquid crystal display element at one face thereof, wherein the planar light source device comprising a light guiding plate constituted in a shape of a plate, having a light irradiating face for irradiating light at one main face thereof and having at least one side edge in a linear shape at a peripheral edge thereof, a linear light source arranged along the side edge of the light guiding plate, a lamp reflector arranged along the side edge of the light guiding plate to cover the linear light source for reflecting light emitted from the linear light source to inside of the light guiding plate, lamp holders each arranged at inside of an end portion of the lamp reflector for holding the linear light source, and a reflection sheet provided at other main face of the light guiding plate opposed to the light irradiating face, wherein the reflection sheet includes a projected portion projected from the side edge of the light guiding plate to inside of the lamp reflector and end portions of the projected portion are provided with notch portions and accordingly, the reflection sheet is not be deformed by being brought into contact with the lamp holders.

BRIEF DESCRIPTION OF THE DRAWINGS

FIG. 1 is a sectional view of a vicinity of a linear light source of a planar light source device according to Embodiment 1 of the invention;

FIG. 2 is a disassembled perspective view of the planar light source device according to Embodiment 1 of the invention;

DETAILED DESCRIPTION OF THE PREFERRED EMBODIMENTS

Embodiment 1

Figure 3:
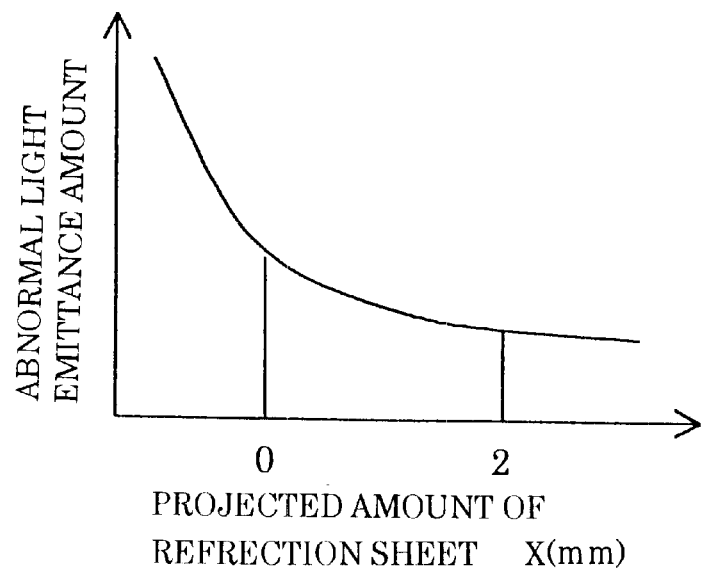
FIG. 3 is a diagram showing a relationship between an amount of a projected reflection sheet and an intensity of abnormal light emittance of the planar light source device according to Embodiment 1 of the invention.

An explanation will be given of a planar light source apparatus according to an embodiment of the invention in reference to the drawing as follows. FIG. 1 is a sectional view of a vicinity of a linear light source of a planar light source device according to Embodiment 1 of the invention and FIG. 2 is a disassembled perspective view of the vicinity of the light source of FIG. 1. In the drawings, numeral 1 designates a linear light source (hereinafter, referred to as lamp) comprising a cold cathode ray tube. Notation 1a designates a lamp holder for protecting an electrode portion of the lamp 1, numeral 2 designates a lamp reflector provided at a surrounding of the lamp 1 for reflecting light emitted from the lamp 1 to a light guiding plate 3. The light guiding plate 3 comprising acrylic species resin having high transmittance of light, which is mounted with the lamp reflector 2 having the lamp 1 at a side edge face of a long side thereof. The light guiding plate 3 is a rectangular plate which have a first and a second main surface 3a and 3b opposed to each other, and there formed a side edge on a side of a long side thereof and a side edge on a side of a short size thereof opposed to each other at peripheral edges thereof. FIG. 2 shows a side edge 3c on a side of a long side thereof and a side edge 3d on a side of a short side thereof which are contiguous to each other. The first main surface 3a of the light guiding plate 3 is a light irradiating face in a rectangular shape for irradiating light to one face of a liquid crystal display element in a shape of a plate sandwiching a liquid crystal material between two transparent substrates opposed to each other as a backlight. The lamp 1 is arranged to extend along the side edge 3c on the side of the one long side of the light guiding plate 3. The lamp reflector 2 is formed to cover the linear lamp 1 and an opening portion 2a thereof is arranged to sandwich the side edge 3c of the light guiding plate 3. The lamp 1 is supported by the lamp holders 1a holding electrode portions at both ends thereof. The lamp holders 1a are provided at the both ends of the lamp 1 and are supported in a state of being fitted to insides of two end portions of the lamp reflector 2. A reflection sheet 4 is pasted to the second main surface 3b of the light guiding plate 3 for reflecting light from the lamp 1 guided to the light guiding plate 3 toward the first main surface 3a. The reflection sheet 4 is provided with a projected portion 4a projected from the side edge 3c of the light guiding plate 3 to inside of the lamp reflector 2 and notch portions 5 are formed at both ends of the projected portion 4a.

FIG. 3 is a diagram showing a result of measuring an intensity of abnormal light emittance at a vicinity of the lamp 1 relative to an amount X of the reflection sheet 4 projected from the light guiding plate 3 at inside of the lamp reflector 2. According to the measurement, the diameter of the lamp 1 is 2.3 mm, the thickness of the light incident portion of the light guiding plate 3 is 2.5 mm, the lamp holder 1a is made of silicone rubber and a lamp reflector 2 is made of brass pasted with a film vapor-deposited with silver.

It is found from a result of the measurement shown in FIG. 3 that the amount X of the reflection sheet 4 projected from the light guiding plate 3 and the intensity of abnormal light emittance are brought into a substantially inversely proportional relationship and intensity of abnormal light emittance becomes substantially constant at a vicinity of the projected amount X of 2 mm and larger. Here, the intensity of abnormal light emittance is a measured value at a peak of abnormal light emittance (brightness) at the respective projected amount X and unit thereof is $cd/m^2$. Further, when the projected amount X is minus, that is, when the reflection sheet 4 does not cover a total of the side of the reflecting light face of the reflection sheet 4 and the light guiding plate 3 is exposed, the intensity of abnormal light emittance is extremely increased.

According to the planar light source apparatus used in the embodiment, in correspondence with narrow frame formation of the liquid crystal display apparatus, a length of a side of the light guiding plate 3 mounted with the lamp reflector 2 and a length of the lamp 1 are equal to each other. Therefore, when the reflection sheet 4 is projected from the light guiding plate 3, an interference is caused such that both end portions of the reflection sheet 4 are brought into contact with the lamp holders 1a at the both ends of the lamp 1 and deformed thereby and therefore, the interference can be prevented by providing the notch portions 5 at both end portions of the projected portion 4a of the reflection sheet 4.

According to the embodiment, by projecting the reflection sheet 4 from the light guiding plate 3 to inside of the lamp reflector (Max. 2 mm) the abnormal light emittance at the vicinity of the lamp 1 can be reduced, further, by providing the notch portions 5 at the both end portions of the projected portion 4a of the projected reflection sheet 4, the interference between the projected reflection sheet 4 and the electrode portions or the lamp holders 1a at the both ends of the lamp 1 can easily be prevented.

Embodiment 2

Figure 4:
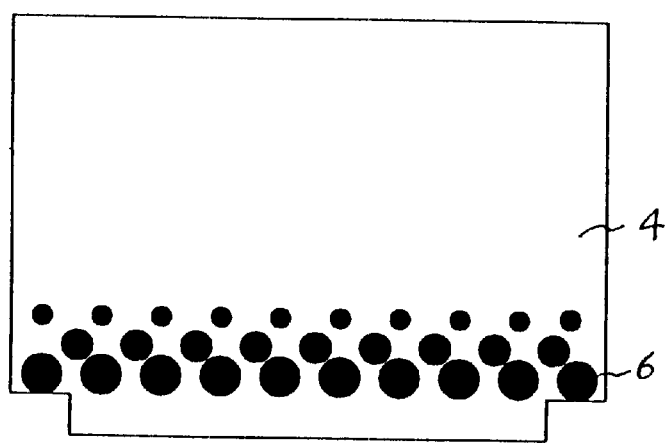
FIG. 4 is a plane view showing a reflection sheet of a planar light source device according to Embodiment 2 of the invention.

FIG. 4 is a plane view showing a reflection sheet of a planar light source apparatus according to Embodiment 2 of the invention. In the drawing, numeral 6 designates a dot pattern constituted by color (black color according to the embodiment) printing for absorbing light formed at the reflection sheet 4 and the dot pattern is formed at an interval of 0.3 mm from an end portion of the reflection sheet 4 on the side of the lamp 1 and is provided with a gradation such that the more remote from the lamp 1, the smaller the shape of the dot pattern 6 becomes. Further, other constitution are similar to that of Embodiment 1 and therefore, an explanation thereof will be omitted.

Figure 5:
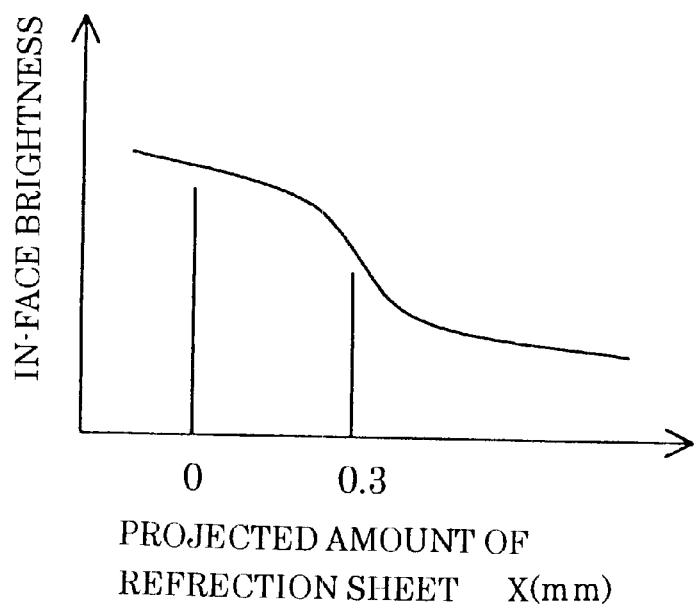
FIG. 5 is a diagram showing a relationship between an amount of the projected reflection sheet and a brightness of the planar light source device according to Embodiment 2 of the invention.
Figure 6:
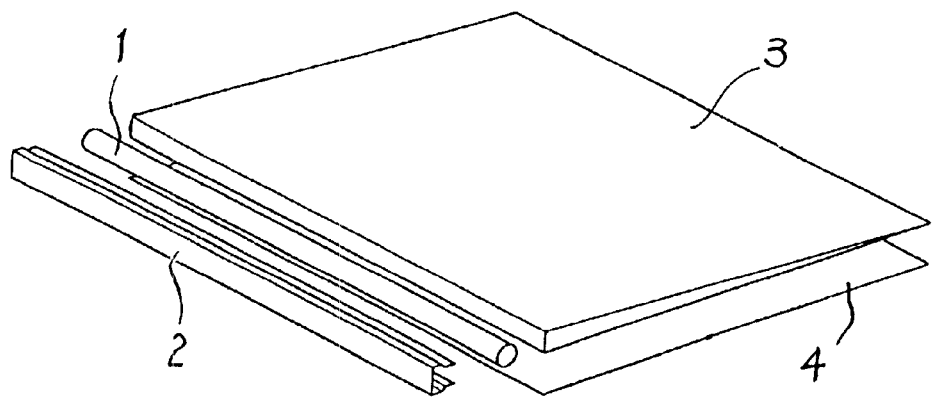
FIG. 6 is a disassembled perspective view of a conventional planar light source device of this kind.
Figure 7:
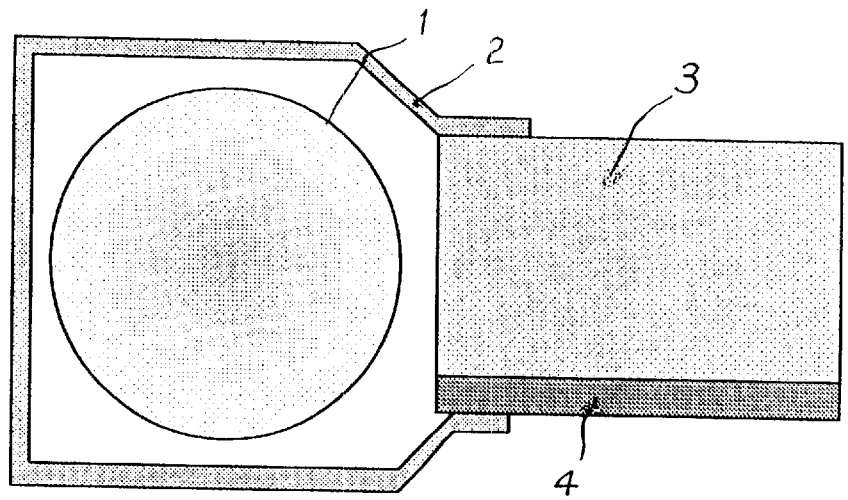
FIG. 7 is a sectional view of a vicinity of a linear light source of the conventional planar light source device.
Figure 8:
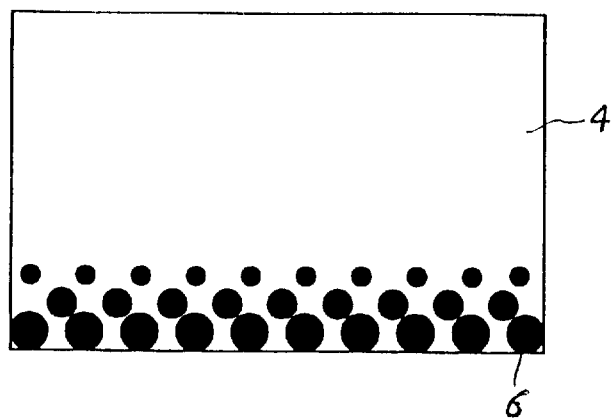
FIG. 8 is a plane view showing a reflection sheet of the conventional planar light source device.

FIG. 5 is a diagram showing a result of measuring a brightness of the planar light source apparatus relative to the amount X of the reflection sheet 4 formed with the dot pattern 6 projected from the light guiding plate 3.

It is found from the measurement result that in-face brightness is gradually reduced by an increase in the projected amount up to the projection amount x of 0 through 0.3 mm and larger. However, at a vicinity of the projected amount X of 0.3 mm, the brightness is significantly lowered, which seems to cause since by exposing the dot pattern 6 comprising black color printing to inside of the lamp reflector 2, the dot pattern 6 absorbs light incident on the light guiding plate 3.

According to the embodiment, even when the reflection sheet 4 having the dot pattern 6 comprising the color printing for absorbing light formed at the reflection sheet 4, is projected from the light guiding plate 3, by forming the dot pattern 6 not to expose to the inside of the light reflector 2, the intensity of abnormal light emittance at a vicinity of the lamp 1 can be reduced without lowering the brightness.

Embodiment 3

By arranging the planar light source apparatus having a constitution shown by Embodiment 1 or Embodiment 2 on a side of a rear face (side of incident face) of a liquid crystal display element of a transmitting type constituted by sandwiching a liquid crystal material between two sheets of transparent insulating substrates opposed to each other, there can be provided a liquid crystal display apparatus having high brightness and uniform display characteristic without nonuniformity of brightness.

As described above, according to the invention, by projecting the reflection sheet from the light guiding plate into the lamp reflector and providing the notch portions at the both end portions of the reflection sheet projected into the lamp reflector, there can be provided a planar light source device having high reliability capable of reducing abnormal light emittance at a vicinity of the lamp without causing interference between the projected reflection sheet and the electrode portions or the lamp holders at the both ends of the lamp.

Further, by not providing color printing for absorbing light to the reflection sheet at a portion thereof projected to inside of the lamp reflector, abnormal light emittance at the vicinity of the lamp can be reduced without causing a deterioration in the brightness.

Further, by using the planar light source device having the above-described constitution, there can be provided the liquid crystal display having high surface grade without nonuniformity of brightness.

What is claimed is:

1. A planar light source device comprising:

a light guiding plate constituted in a shape of a plate, having a light irradiating face for irradiating light at one main face thereof and having at least one side edge in a linear shape at a peripheral edge thereof;

a linear light source arranged along the side edge of the light guiding plate;

a lamp reflector arranged along the side edge of the light guiding plate to cover the linear light source for reflecting light emitted from the linear light source to inside of the light guiding plate;

lamp holders each arranged at inside of an end portion of the lamp reflector for holding the linear light source; and a reflection sheet provided at other main face of the light guiding plate opposed to the light irradiating face;

wherein the reflection sheet includes a projected portion projected from the side edge of the light guiding plate to inside of the lamp reflector and end portions of the projected portion are provided with notch portions for avoiding interference between the reflection sheet and the lamp holders.

2. The planar light source apparatus according to claim 1:

wherein an amount of the reflection sheet projected from the light guiding plate is shorter than 2 mm.

3. The planar light source apparatus according to claim 1:

wherein a portion of the reflection sheet proximate to the linear light source is subjected to color printing for absorbing light without a portion thereof projected from the light guiding plate.

4. A liquid crystal display including a liquid crystal display element in a shape of a plate for sandwiching a liquid crystal material between two sheets of transparent substrates opposed to each other and a planar light source device arranged with the liquid crystal display element at one face thereof;

wherein the planar light source device comprising:

a light guiding plate constituted in a shape of a plate, having a light irradiating face for irradiating light at one main face thereof and having at least one side edge in a linear shape at a peripheral edge thereof;

a linear light source arranged along the side edge of the light guiding plate;

a lamp reflector arranged along the side edge of the light guiding plate to cover the linear light source for reflecting light emitted from the linear light source to inside of the light guiding plate;

lamp holders each arranged at inside of an end portion of the lamp reflector for holding the linear light source; and a reflection sheet provided at other main face of the light guiding plate opposed to the light irradiating face;

wherein the reflection sheet includes a projected portion projected from the side edge of the light guiding plate to inside of the lamp reflector and end portions of the projected portion are provided with notch portions for avoiding interference between the reflection sheet and the lamp holders.

* * * * *